Dec. 13, 1966  W. H. NOVALES ET AL  3,291,319
SELF-LOCKING SHELVING FRAME MEMBERS
Filed March 4, 1965  2 Sheets-Sheet 1

INVENTORS
WILLIAM H. NOVALES
JACQUES K. KAYARIAN
BY
Eckhoff & Slick
ATTORNEYS

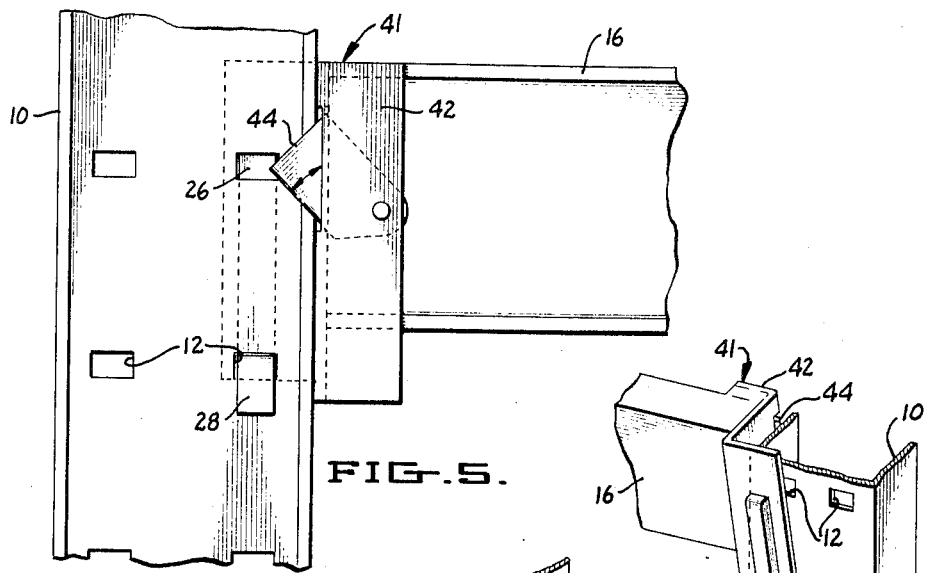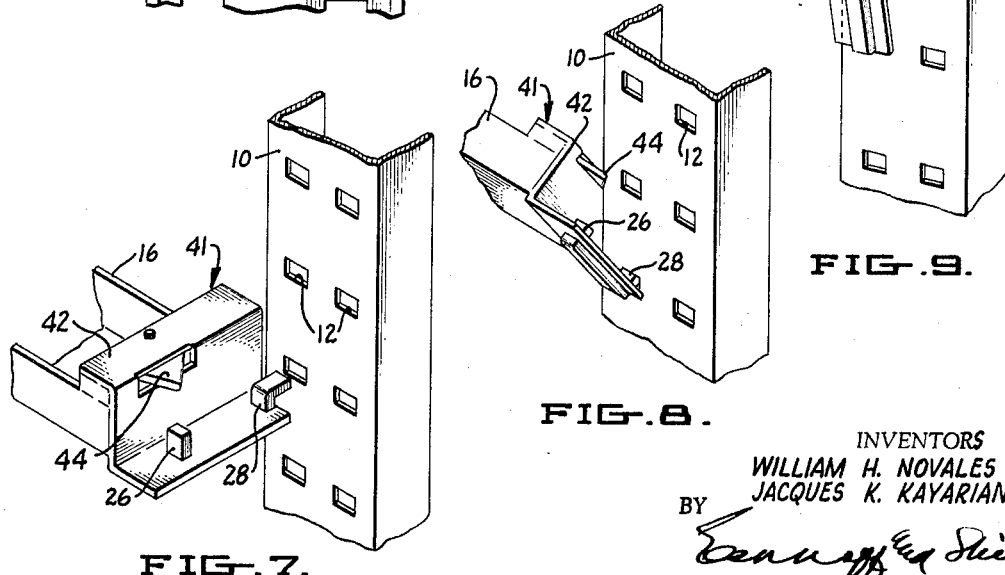

United States Patent Office 3,291,319
Patented Dec. 13, 1966

3,291,319
SELF-LOCKING SHELVING FRAME MEMBERS
William H. Novales, P.O. Box 8364, Oakland, Calif.,
and Jacques K. Kayarian, 5726 Tehama Ave., Richmond, Calif.
Filed Mar. 4, 1965, Ser. No. 438,473
5 Claims. (Cl. 211—177)

This is a continuation-in-part of application Serial No. 423,655, filed January 6, 1965, now abandoned.

This invention relates in general to a storage rack frame and more particularly to a mechanism for automatically locking into a unitary relationship horizontal beams and vertical rails consituting rack supports.

Industrial storage racks are often inadvertently disassembled as, for example, when items are being loaded or unloaded onto or from the beams. This usually happens because of carelessness on the part of a fork-lift truck operator who permits part of the load, or perhaps a pallet or a fork member to strike one of the upright rails or horizontal beams from which the rack frame has been assembled. To eliminate collapse of beams, safety engineers generally insist upon the use of bolts and nuts so as to secure the structural elements firmly together. However, the use of bolts and nuts makes assembly and disassembly more difficult and it is often observed that the nuts and bolts are left out or become loosened in time.

In an effort to speed assembly of rack frames, various arrangements utilizing studs or lugs and holes in one or another of the members have been worked out. These generally rely upon a wedging action which makes the strucural elements difficult to disassemble, but still liable to collapse should they receive a sharp blow, as during the loading or unloading operation. It is also generally observed that the somewhat more sophisticated systems which dispense with bolts and nuts require the use of fabricated box channels which must be punched in the open and then bent or roll-formed. This precludes using the standard structural channel or other structural sections which are relatively inexpensive, thus running the cost of these assemblies up considerably.

Efforts have been made to provide a substitute for the customary bolt by mounting pins directly on one or another of the members constituting the frame, which pins must then be manually forced into place in a corresponding hole in one or another of the members. The assemblers, however, often leave the pins out or find that they do not slide readily into place, and the safety feature is thereby defeated. The lugs readily become disengaged if a rail or beam is moved during a loading or unloading operation and the rack beams, which may support several tons, sometimes collapse. Another disadvantage is that loose pins, wedges or other manual locking devices may be lost before assembly and therefore not made use of to secure the assemblies with any measure of safety.

It is therefore an object of this invention to provide a relatively simplified but always operative locking device for horizontal beams and vertical rails intended to be assembled to form a rack frame.

It is a further object of this invention to provide a rack frame which may be formed entirely of standard or mill rolled channel or other standard structural member since it does not require a careful fit of a lug and hole, as is common in the case of structures relying on a wedging action for structural integrity.

Still another object of this invention is to provide a latching mechanism which operates automatically at the time of assembly of horizontal beam members and vertical rail members. That is, no action of the assembler is required beyond the mere inserting of one or more lugs in one or more holes, yet the latching and locking action necessarily takes place as an incident to the assembling action.

Still another object of this invention is to provide a locking system for rack frame elements which cannot be defeated inadvertently.

Yet another object of this invention is to prevent beams and rails from becoming unlocked by pressure, irrespective of the angle in a three-dimensional plane from which such pressure is applied.

Further objects and advantages of this invention, if not specifically set forth, will become apparent during the course of the description which follows.

In the drawings:

FIGURE 5 is a view similar to FIGURE 2 showing a modification of the invention.

FIGURE 6 is a view similar to FIGURE 3 showing the aforementioned modification.

FIGURES 7, 8 and 9 show the method of assembling the elements incorporating the modified form of the invention of FIGURES 5 and 6.

Generally, this invention comprises a rack frame having horizontal beam members and vertical rail members and including means for joining a horizontal beam member and vertical rail member, said means comprising at least a single hole in the said vertical rail, at least a single lug integral with said horizontal beam, said lug being sized to register with said hole in said horizontal beam, and a pivotally mounted latch on said horizontal beams, said latch having at least two positions including a first raised position, wherein said lug may be placed in said hole in said vertical rail and a second lowered position wherein said latch prevents said lug from being removed from said vertical rail. The latch which is in the second position by the action of the force of gravity is rotated by the edge of the rail to the first position while passing said edge of the rail.

Figure 1:
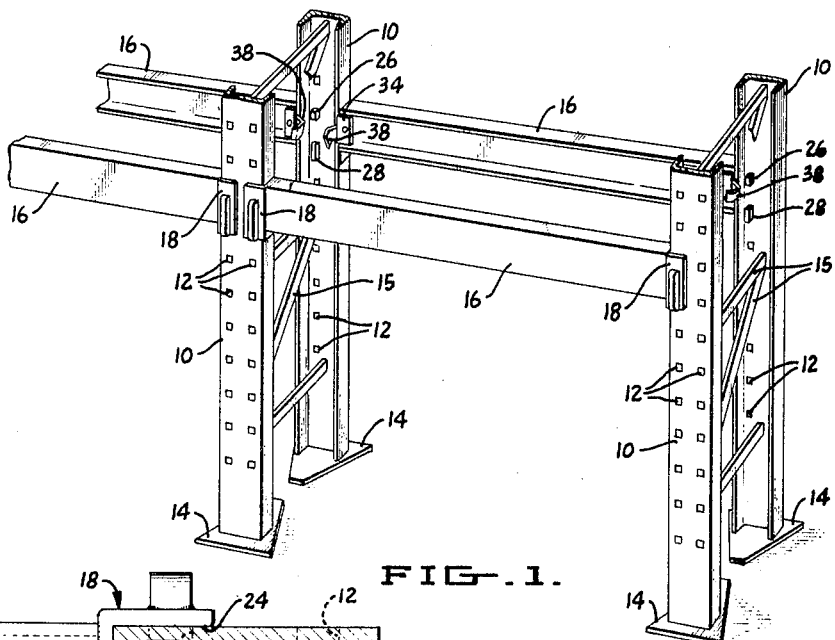
FIGURE 1 shows a partially assembled rack frame composed of four upright or vertical rails and portions of four parallel horizontal beams, each of which is locked into place against rail members.

Referring now to the drawings wherein like characters refer to like parts throughout, there is shown in FIGURE 1 four identical vertical or upright rail members 10, each of which is provided with a plurality of pairs of holes 12 which may be rectangular, as shown, or any other shape as will appear hereafter. Each of the upright rails incorporated in the overall frame is made of standard mill rolled channel into which the holes 12 have been punched. Each of the upright members is provided with a foot 14 and braces 15 secure them together in pairs. The holes 12 may be spaced equidistantly along the entire length of each vertical rail 10, so as to provide for infinite adjustability in the height of horizontal beams 16. In the alternative, the holes 12 may be grouped in two rows of, say, four each, followed by another similar group, so as to eliminate the necessity for removing a great deal of metal from the upright rails 10.

Beams 16 are also formed of standard mill rolled channel, as illustrated, but could be standard I-beams, wide flange beams, angle iron or other shapes. Welded to each end of each beam 16 is a piece of angle shaped metal 18. One inner surface 20 thereof is intended to lie against the flange 22 of rail 10, and the other inner surface 24 thereof lies against a portion of the back of upright rail 10. Extending normal to the inner surface 24 are the vertically spaced lugs 26 and 28. As is seen especially in FIGURE 4, the lugs are preferably each of a distinctive shape, when viewed in elevation. Lug 26 is simply a rectangular element sized to fit in one of the holes 12. Lug 28, however, is generally hook- or L-shaped.

Figure 3:
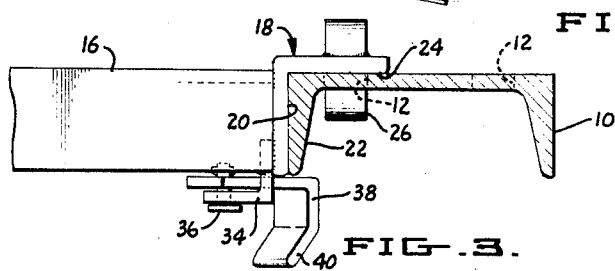
FIGURE 3 is an enlarged plan view showing a rail, beam and locking mechanism.
Figure 2:
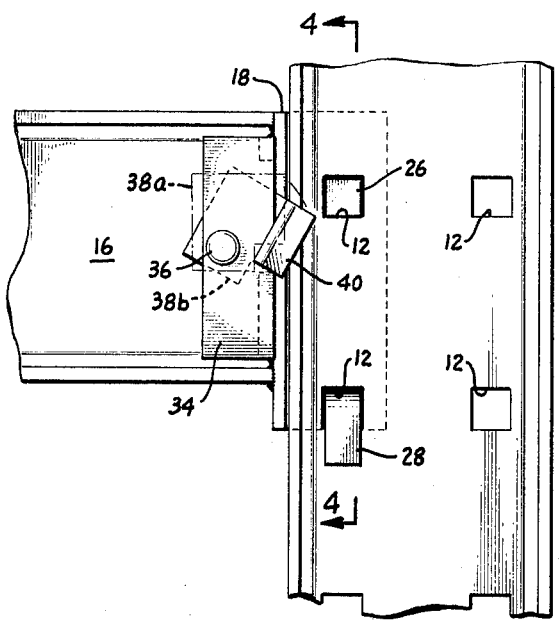
FIGURE 2 is an enlarged fragmentary view of a rail, beam and locking mechanism.
Figure 4:
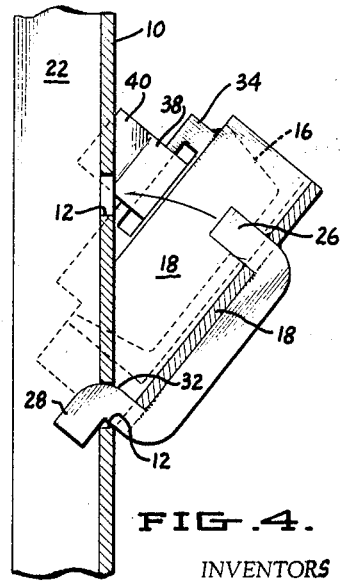
FIGURE 4 is a view taken generally through the line 4—4 of FIGURE 2 showing the method for assembling a horizontal beam and an upright rail.

Welded to an inner surface of each of the horizontal beams 16 is a flange 34. The flange may be welded directly to the angle 20 so as to be held firmly in place. Pivotally mounted on hinge pin 36 of the flange 34 and projecting through the slot therein which may be seen in FIGURE 4 is latch 38, which has at least two positions. These are shown in FIGURE 2. In the first position (38a) the latch is raised so that the beam and rail may be assembled. In the second position (38b) wherein the latch is no longer horizontal, but has tilted downwardly and toward the right in the figure, the latch has become locked against an edge of flange 22 of the upright rail 10. The latch is seen in this position in FIGURE 3 and in FIGURE 1.

In the modification of FIGURES 5–9, the horizontal beam 16 supports a Z-shaped element 41 to the flange 42 of which is pivoted a small flat piece of round, aged, milled or cold rolled steel 44. This latch 44 is simpler in construction but functionally substantially identical to the latch 38 of the structure of FIGURES 1–4. This modification has the advantage that when one of the beams 16 is dropped on a flat surface, as concrete, there is no exposed portion of the latch and damage of the unit is less likely.

To assemble horizontal beam members and vertical rail members, rail frames are simply set upright on their feet and the leading end of a lug 28 inserted into one of the holes 12. At this point, the beam 16 is in the position shown in FIGURE 4. Because of its backwardly bent leading edge 40, the latch is automatically forced into the first position so as to permit the lug 26 to be inserted in another of the holes 12 as the beam 16 is rotated in the direction of the arrow of FIGURE 4. In the event of one lug only being used, this should be lug 28 only and the beam is rotated about lug 28 into the vertical position; latch 38 drops to the second position, thus engaging the beam. As the surface 24 of the angle shaped metal 18 reaches the back of the rail 10 and the lug 26 is inserted to a maximum degree, the latch 38, which pivots freely around pin 36, drops into the position seen in FIGURES 1 and 4 and seen as position 2 in FIGURE 2. Locking is thereby automatic, and the assembler need perform no further handling.

None of the elements is wedged together so that disassembly is easily accomplished, provided that the latch 38 is intentionally lifted and beam 16 rotated backwardly. However, when the lock is rotated clockwise, as seen in FIGURE 2, irrespective of the direction from which pressure is applied in the three-dimensional plane, the elements cannot become disassembled. There must be a deliberate lifting of the latch. Each hole 12 is relatively large, as compared with the mating lug and so that no great amount of force is required to assemble the elements. Equally important, when a heavy load is placed on the horizontal beams so as to flex them, the vertical rails are not simultaneously flexed since the lugs 26 and 28 do not fit so tightly as to force the rails into a flexed posture. This is an advantage over the standard arrangement involving the wedging action of a lug and hole since the vertical rails are most sturdy and least liable to collapse when they are permitted to remain perfectly upright without flexure.

The latch is positioned, as shown on the inside of each horizontal beam since the fork-lift truck or its load is least likely to contact the latch when the latter is protected in this fashion. Furthermore, it is possible to reverse the position and orientation of the studs 26 and 28, though with somewhat less satisfactory results, from the safety standpoint. Finally, the holes might be punched in the beam and the studs mounted on the rail, if desired. The use of a hooked lug 28 is desirable since this prevents rotation of the beam out of an upright.

The modification of FIGURES 5–9 is assembled in substantially the same fashion, as especially seen in FIGURES 7–9. Because the leading edge of latch 44 extends at an angle when in its lowermost position, as seen in FIGURE 7, it is in a position permitting the upright rail member 10 to force the latch to retract, especially as seen in FIGURES 8 and 9, while the beam is swung into place. After the Z-shaped element 41 lies flat against the beam 10, the latch drops back into place, as seen in FIGURES 5 and 6.

Obviously many modifications and variations of this invention may be made without departing from the spirit and scope thereof and therefore only such limitations should be imposed as are indicated in the appended claims.

We claim:
1. In a rack frame having horizontal beam members and vertical rail members, the improvements comprising:
 (a) means for joining a horizontal beam member and a vertical rail member, said rail member having perpendicular first and second surfaces, said means comprising:
  (1) at least a single hole in said first vertical surface of said vertical rail;
  (2) at least a single lug integral with said horizontal beam, said lug being sized to register with said hole in said vertical rail; and
  (3) a pivotally mounted latch on said horizontal beam, said latch having at least two positions including a first raised position wherein said lug may be placed in said hole in said vertical rail and a second lowered position wherein said latch prevents said lug from being removed from said hole, said latch and said lug being horizontally spaced from one another on said beam whereby the said lug registers with said hole in said first vertical surface and said latch registers with the second of the said vertical surfaces when the said latch is in the second lowered position.

2. The structure of claim 1 wherein each rail has a pair of holes and each beam has a pair of lugs, the lowermost lug of the said beam being generally of hooked shape.

3. The structure of claim 1 wherein the said latch is mounted in such a fashion as to normally assume the second position under the influence of gravity.

4. The structure of claim 1 wherein the said horizontal beams each have a piece of angle shaped metal welded to the ends thereof, and wherein a pair of lugs extend normal to the surface of said angle shaped metal and generally perpendicular to the back of the said horizontal beam, the lowermost of said lugs having generally hooked shape.

5. The structure of claim 4 wherein the said vertical rail member has a pair of spaced holes positioned to register with said lugs, and wherein the said latch is pivotally mounted whereby, under the influence of gravity, the said latch assumes the second position, and wherein the said latch is positioned to contact one of the said vertical rail members when said lugs are inserted into said holes in the said vertical rail members.

(References on following page)

References Cited by the Examiner

UNITED STATES PATENTS 2,814,892  12/1957  Larsen _____ 108—144 X
3,042,221  7/1962   Rasmussen _____ 211—148
3,054,511  9/1962   Erismann _____ 211—176

FOREIGN PATENTS 184,778  8/1963   Sweden.
349,048  11/1960  Switzerland.

CLAUDE A. LE ROY, *Primary Examiner.*
R. P. SEITTER, *Assistant Examiner.*